(12) United States Patent
Oh

(10) Patent No.: US 6,665,096 B1
(45) Date of Patent: Dec. 16, 2003

(54) APPARATUS AND A METHOD FOR IMAGE PROCESSING

(75) Inventor: Hyang-Su Oh, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/201,153

(22) Filed: Nov. 30, 1998

(30) Foreign Application Priority Data

Nov. 29, 1997 (KR) ............................................. 97 64372
Dec. 17, 1997 (KR) ............................................. 97 70034

(51) Int. Cl.⁷ ............................. H04N 1/40; G03F 3/08
(52) U.S. Cl. ....................... 358/461; 358/445; 358/444; 382/274
(58) Field of Search ................................ 358/461, 445, 358/446, 465, 466, 463, 464, 444, 523, 519, 517, 518; 382/274

(56) References Cited

U.S. PATENT DOCUMENTS

| | | | | |
|---|---|---|---|---|
| 4,660,082 A | * | 4/1987 | Tomohisa et al. | 358/446 |
| 5,146,351 A | * | 9/1992 | Maehara | 358/448 |
| 5,191,445 A | * | 3/1993 | Kurokawa et al. | 358/461 |
| 5,296,944 A | * | 3/1994 | Suzuki et al. | 358/475 |
| 5,402,249 A | * | 3/1995 | Koseki et al. | 358/446 |
| 5,673,124 A | * | 9/1997 | Kaji et al. | 358/474 |
| 5,786,905 A | * | 7/1998 | Kaji et al. | 358/498 |

* cited by examiner

Primary Examiner—Cheukfan Lee
(74) Attorney, Agent, or Firm—Robert E. Bushnell, Esq.

(57) ABSTRACT

An apparatus and a method for processing image capable of correcting errors due to an object difference in accordance with an element characteristic of an image reading sensor which is mounted in an image inputting device and removing an effect on the image due to a distortion of a white reference plate and a light source which are mounted in the image inputting device. The method for processing image according to one aspect of the present invention includes the steps of generating reference data to correct an image distortion of document image; determining which operation is selected from operations for controlling a contrast and a brightness, and for removing a background color; generating an upper limited reference voltage and a lower limited reference voltage corresponding to the selected operation; and performing a white correction and a black correction simultaneously of the image by using the reference data while performing the selected operation for the image by using the upper limited reference voltage and the lower limited reference voltage which are set.

20 Claims, 7 Drawing Sheets

APPARATUS AND A METHOD FOR IMAGE PROCESSING

CLAIM OF PRIORITY

This application makes reference to, incorporates the same herein, and claims all benefits accruing under 35 U.S.C §119 from an application entitled An Apparatus And Method For Processing Image earlier filed in the Korean Industrial Property Office on Nov. 29, 1997, and there duly assigned Serial No. 97-64374 by that Office, and an application entitled An Apparatus And Method For Processing Image earlier filed in the Korean Industrial Property Office on Dec. 17, 1997, and there duly assigned Serial No. 97-70034 by that Office.

BACKGROUND OF THE INVENTION

1. Field of the Invention

The present invention relates to an apparatus and a method for image processing, and more particularly to an apparatus and a method for image processing capable of improving a quality of an image by correcting a distortion, of an image reading sensor or a light source for analog signals proportional to quantity of light which is reflected in accordance with state of an object and obtaining a fine image by controlling a contrast and a brightness of the object and removing a background color of the object.

2. Description of the Prior Art

In general, a scanner emits light to an object and converts the light reflected by the object into an electric output value through a charge coupled device (hereinafter, referring to as CCD) and a contact image sensor (hereinafter, referring to as CIS). The output value is generally stored in a data storing device such as a harddisc of a personal computer.

The scanner which reads contents of the object such as books and pictures is made to carry out only a scanning function, or is integrated with a printer and a facsimile device.

An analog signal which is output from a CCD sensor as a photoelectric conversion device in a general color image processing device has a deviation due to an object difference between pixels of a CCD sensor as a semiconductor element. When the scanner reads an image, a quality of the image is degraded due to a distortion of a white reference plate and light emitting characteristics of a halogen lamp or a fluorescent lamp which is used as a light source.

In order to prevent the quality degradation of the image which is induced by the circuit element and parts, a black correction is carried out to correct the object difference due to an element characteristic of CCD sensor in the inputting device. Also, a white correction is carried out to remove an effect on the image due to the distortion of the white reference plate and the light source such as the fluorescent lamp or the halogen lamp.

In general, a method for correcting the distortion of the color image inputting device has three steps. That is, the method for correcting the distortion of the color image includes the steps of: reading a quantity of dark current which is output from pixels of the CCD sensor to obtain a black correcting data and then subtracting the black correcting data from the analog signals which are output from the CCD sensor in the state that a light is not input into the CCD sensor; detecting a maximum value of an image signal which is output after applying an electric power to the electric source and carrying out the black correction for the analog signal reflected by the white reference plate; and carrying out an operation for regulating the white correcting data, which is generated by detecting the distortion of the white reference plate and the light source in the range between the black reference voltage and the maximum value of the analog signal reflected by the white reference plate after applying the electric power to the light source.

The correcting the distortion of the color image inputting device will be described in detail with reference to FIG. 1. As shown in FIG. 1, during output of the analog image signal, by driving a CCD sensor (not shown) in the state that the electric power is not applied to a light source (not shown) of the CCD sensor, an analog to digital converter 201 (hereinafter, referring to as A/D converter) carries out an operation to obtain the black correcting data while the analog image signal, which is output from the CCD sensor in the range between a black reference voltage $V_{Bref}$ and a black maximum voltage $V_{Bmax}$, is converted into digital data, which in turn is stored in a memory 202 for as the black correcting data for correcting black. Memory 202 has a storage capability proportional to the number of effective pixels of the CCD sensor, in which the black correcting data are stored in an order corresponding to an output synchronous signal of the CCD sensor. Then, the electric power is applied to the light source so as to detect light reflected by a white reference plate (platen) into the CCD sensor. The black correcting data are converted into their analog value by a digital to analog converter 203 (hereinafter, referring to as D/A converter). A black correcting device 204 carries out the operation for correcting black by subtracting the analog values of the black correcting data from the analog image signal output from the CCD sensor. The black corrected analog image signal is input into an A/D converter 205 is converted into digital data in the range between a white maximum voltage $V_{Wmax}$ and the black reference voltage $V_{Bref}$. These digital data are then input in into a detector 206 for detecting a maximum digital value, and the maximum digital valueis converted to an analog signal $V_{PEAK}$ (maximum value of pixel data of the white reference plate) by a D/A converter 207. An A/D converter 208 converts the black corrected analog image signal into digital data in the range between the black reference value $V_{Bref}$ and the maximum value of pixel data $V_{PEAK}$. These digital data are stored in a memory 209 as white correcting data for correcting white.

Accordingly, when the operation is carried out to read a substantial image of an object (such as a color picture or a document), the electric power is applied to the light source to input the light reflected by the object into the CCD sensor. When an image of an object is detected by the CCD sensor, black correcting device 204 carries out the operation for correcting the black of the data in response to the black correcting data transmitted from the black correcting memory 202 to the black correcting device 204 through the D/A converter 203. White correcting device 211 carries out the operation for correcting the white of the black corrected image, output from correcting device 204, in response to the white correcting data transmitted from the white correcting memory 209 to white correcting device 211 through D/A converter 210. The image signal of which the distortion is corrected (black corrected and white corrected) is converted into digital image data between the black reference voltage $V_{Bref}$ which the:data, which are transmitted through the A/D converter 212 and the data bus and stored in a latch 215, are converted into by the D/A converter 214 and the white reference voltage $V_{Bref}$ which the data, which are stored in the latch 216 through the data bus, are converted into by D/A converter 213. Therefore, the image of the object can be read by using the digital data.

Here, in the color image inputting apparatus presently produced, an application specific integrated circuit (hereinafter, referring to as ASIC) is used as a circuit which carries out correction of the distortion.

In the image processing according to the present invention, however, since given values in a predetermined range are selectively used to control the contrast and brightness of the image by necessity, there is a problem in that when the values are better applied to the object, the control program of the image inputting apparatus is modified to reset appropriate parameters according to the condition of the object.

SUMMARY OF THE INVENTION

The present invention has been made to overcome the above described problem of the prior art.

It is an object of the present invention to provide an apparatus and a method for processing an image, in which a user can print the best image responding to a function selected by the user by adding to a program of the inputting device functions of removing a distortion and a background color of the images and controlling a contrast and a brightness of the image with respect to conversion of an analog image signal to a digital image signal, To accomplish the above object of the present invention, according to an aspect of the present invention, there is provided an apparatus for processing image comprising: an A/D converter for converting an analog image signal with respect to document data which are detected and input by image reading sensor of the image inputting device into digital data by using a control signal input from a controller of a image inputting device, a changed value of a contrast input from the control section, and a changed value of a brightness an upper limited reference voltage setting means for setting the upper limited reference voltage so that the A/D converter performs a correcting of image distortion and a processing of image a lower limited reference voltage setting means for setting the lower reference voltage so that the A/D converter performs a correcting of image distortion and a processing of image; a black correcting memory for storing a black correcting data out put after the A/D converter performs an operation of converting the analog signal into digital signal; a white correcting memory for storing a black correcting data output after the A/D converter performs an operation of converting the analog signal into the, digital signal; and a maximum value detector for detecting a maximum pixel data value from digital image data output from the A/d converter. The control signal includes: a signal for selecting a mode of reading a magnitude of a black current output from pixels of the image reading sensor; a signal for selecting a mode of reading a maximum value of an image signal output after a black correcting operation is performed with respect to an analog signal reflected by a white reference plate of the image inputting device, a signal for selecting a mode of performing an equalization of the image after detecting distortions of a light source and the white reference plate of the image inputting device; a signal for selecting a mode of controlling a contrast to control the contrast of the document; and a signal for selecting a mode of removing a background color to remove the background color from the document. The signal for selecting the mode of removing the background color includes a signal for selecting a maximum pixel value of the document obtained in a prescanning mode as the upper limited voltage. The upper limited reference voltage setting means includes; a first adder for adding a changed value of the upper limited value input from the controller for controlling the contrast to the data output from the white correcting memory and adding the upper limited value for controlling the brightness input from the controller to the data output from the white correcting memory so as to obtain the upper limited reference voltage; a first selector for selecting any one of a value output from the first adder, a value output from the maximum value detector, and a preset and input value according to the operation signal of the image inputting device; and a first D/A converter for receiving the value selected by the first selector as an input value and converting the input value into the analog signal. The lower limited reference voltage setting means includes: a second adder for adding a changed value of the lower limited value input from the controller for controlling the contrast to the data output from the black correcting memory so as to obtain the lower limited reference voltage; a second selector for selecting any one of a value output from the black correcting memory and a preset and input value according to an operation signal of the image inputting device; and a second D/A converter for receiving the value selected from the second selector as an input value and converting the input value into the analog signal.

According to another aspect of the present invention, there is provided an apparatus for processing image comprising: an A/D converter for converting an analog image signal with respect to document data which are detected and input by image reading sensor of the image inputting device into digital data by using a control signal input from a controller of a image inputting device, a changed value of a contrast input from the control section, and a changed value of a brightness; an upper limited reference voltage setting means for setting the upper limited reference voltage so that the A/D converter performs a correcting of image distortion and a processing of image; a lower limited reference voltage setting means for setting the lower reference voltage so that the A/D converter performs a correcting of image distortion and a processing of image; a black correcting memory for storing a black correcting data output after the A/D converter performs an operation of converting the analog signal into digital signal; a white correcting memory for storing a black correcting data output after the A/D converter performs an operation of converting the analog signal into the digital signal; a maximum value detector for detecting a maximum pixel data value from digital image data output from the A/d converter; and a reference data storing means for storing data output from the maximum value detector. The control signal includes: a signal for selecting a mode of reading a magnitude of a black current output from pixels of the image reading sensor; a signal for selecting a mode of reading a maximum value of an image signal output after a black correcting operation is performed with respect to an analog signal reflected by a white reference plate of the image inputting device; a signal for selecting a mode of performing an equalization of the image after detecting distortions of a light source and the white reference plate of the image inputting device; a signal for selecting a mode of controlling a contrast to control the contrast of the document data; and a signal for selecting a mode of removing a background color to remove the background color from the document data. The signal for selecting the mode of removing the background color includes a signal for selecting a maximum pixel value of the document obtained in a prescanning mode as the upper limited voltage and a signal for selecting a maximum pixel value in a main scanning line of the image inputting device as the upper limited reference voltage if an intensity of the background is changed in the document data. The upper limited reference voltage setting means includes; a first D/A converter for receiving a value output from the reference data storing section; a first adder for adding a changed value of the upper limited value input from the controller for controlling the contrast to the data output from the white correcting memory and adding the upper limited value for controlling the brightness input from the controller to the data output from the white correcting memory so as to obtain the upper limited reference voltage; a second D/A converter for receiving a value output from the first adder as an input value and converting the input value into an analog signal; electrostatic voltage generators for generating the black correcting value and a reference voltage for detecting the maximum value; and a first analog switch for selecting any one of data output from the first D/A converter, the second D/A converter, and the electrostatic generators according to the control signal so as to set the one of data as the upper limited reference voltage of the A/D converter. The electrostatic generators includes a maximum black voltage generator for generating the upper limited reference voltage to create the black correcting value and a maximum white voltage generator for generating the upper limited reference voltage to detect the maximum value. The lower limited reference voltage setting means includes: a black reference voltage generator for generating a lower limited reference voltage to create the black correcting value; a second adder for adding a changed value of a lower limited value for controlling a contrast input from the controller to data output from the black correcting memory so as to obtain a lower limited reference voltage; a third D/A converter for receiving a value output from the second adder as an input value and converting the input value into an analog signal; and a second analog signal for selecting any one of data output from the third D/A converter and the black reference voltage generator so as to set the lower limited reference voltage of the A/D converter according to the control signal. The reference data storing means includes: a first latch for storing a maximum pixel value for a white reference plate of the image inputting device; a second latch for storing a maximum pixel value of a document data obtained by prescanning the document; and a third latch for storing a maximum pixel value in a main scanning line of the image inputting device.

According to still another aspect of the present invention, there is provided a method for processing image which includes the steps of generating reference data so as to correct a distortion of the image; determining which operation is selected from operations for respectively controlling a contrast and a brightness, and for removing a background color of the image; generating an upper limited reference voltage and a lower limited reference voltage corresponding to the selected operation; and performing a white correction and a black correction of the image simultaneously by using the reference data while performing out the selected operation for the image by using the upper limited reference voltage and the lower limited reference voltage which are set.

According to the present invention, black correcting data, a maximum data value of pixels, and white correcting data are used as the reference data. The black correcting data are used for correcting deviation due to an object difference according to an element characteristic of an image reading sensor mounted in an image inputting apparatus while the white correcting data are used for removing an effect on the image due to a distortion of a white reference plate and a light source mounted in the image inputting apparatus.

According to the present invention, the step for setting the upper limited reference voltage and the lower limited reference voltage to control the contrast of the image includes the steps of: multiplying a contrast control level by a changed value of the contrast; generating the upper limited reference voltage by reducing a multiplied value from a white correcting data which are output from the white correcting memory; and generating the lower limited reference voltage by subtracting the multiplied value from a black correcting data which are output from the black correcting memory. The changed value of the contrast can be obtained by dividing the maximum value of pixel of the white reference plate in the image inputting apparatus by the control level of the contrast.

According to the present invention, the step for setting the upper limited reference voltage and the lower limited reference voltage to control the brightness includes the steps of multiplying a brightness control level by a changed value of the upper limited reference values; generating the upper limited reference value by subtracting the multiplied value from a white correcting data which are output from the white correcting memory, and generating a lower limited reference voltage for a black correcting data which are output from the black correcting memory. The changed value of the upper limited reference values is obtained by subtracting a maximum pixel value of image which is detected during a prescanning from the maximum pixel value of the white reference plate in the image inputting apparatus and by dividing the reduced value by a maximum control level of the brightness.

According to the present invention, furthermore, the maximum pixel value of the image which is detected by the detector for measuring the maximum value is used as the upper limited reference value while the black correcting data which is output from the black correcting memory is used as a maximum control level of the brightness, in order to remove the background color. The image of the object of which the distortion is corrected and for which the selected operation is carried out is output in a form of a digital image.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein.

DESCRIPTION OF THE PREFERRED EMBODIMENT

Hereinafter, a preferred embodiment of the present invention will be described in detail with reference to the accompanying drawings.

Figure 1:
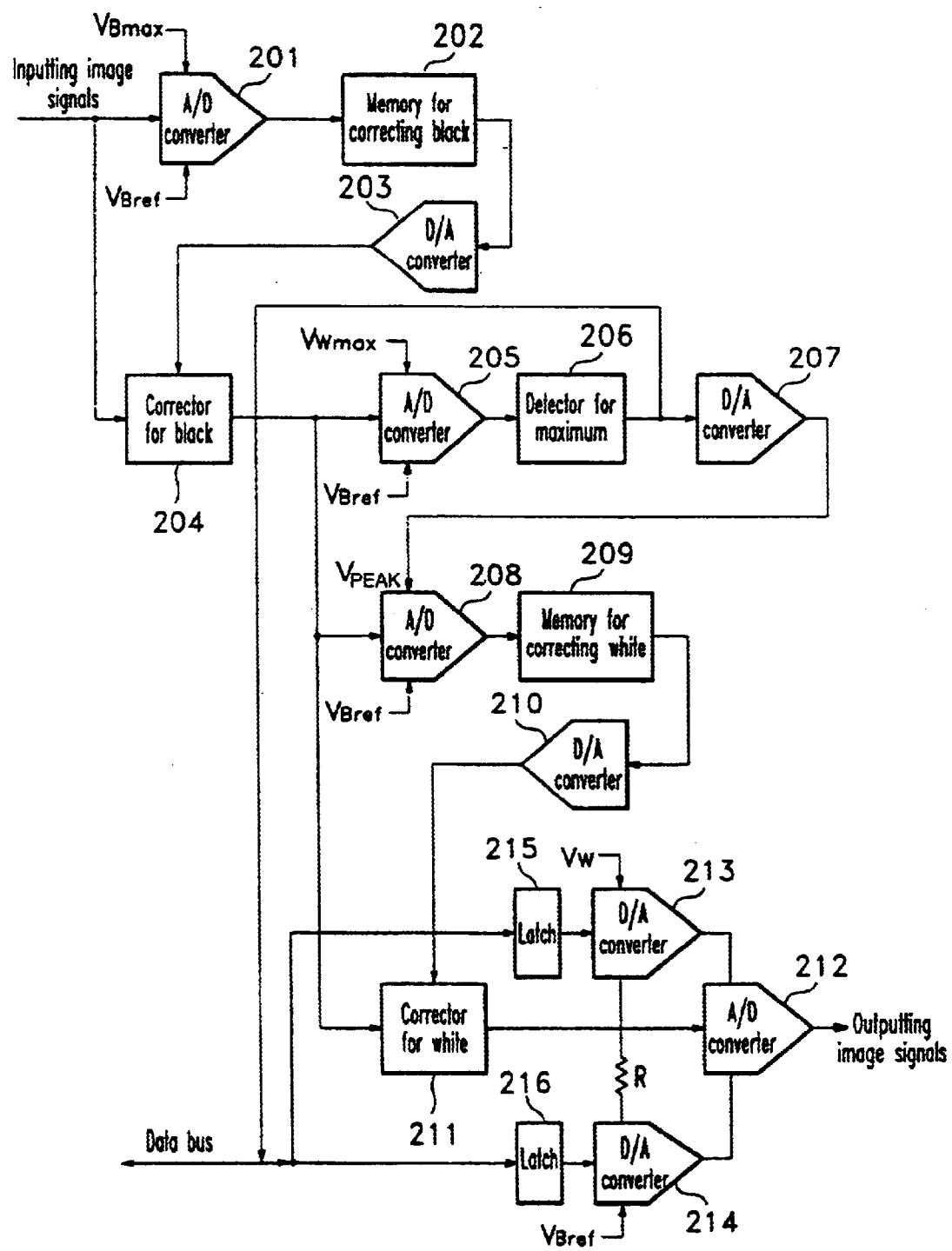
FIG. 1 is a block diagram showing a construction f a preprocessor according to the prior art.
Figure 2:
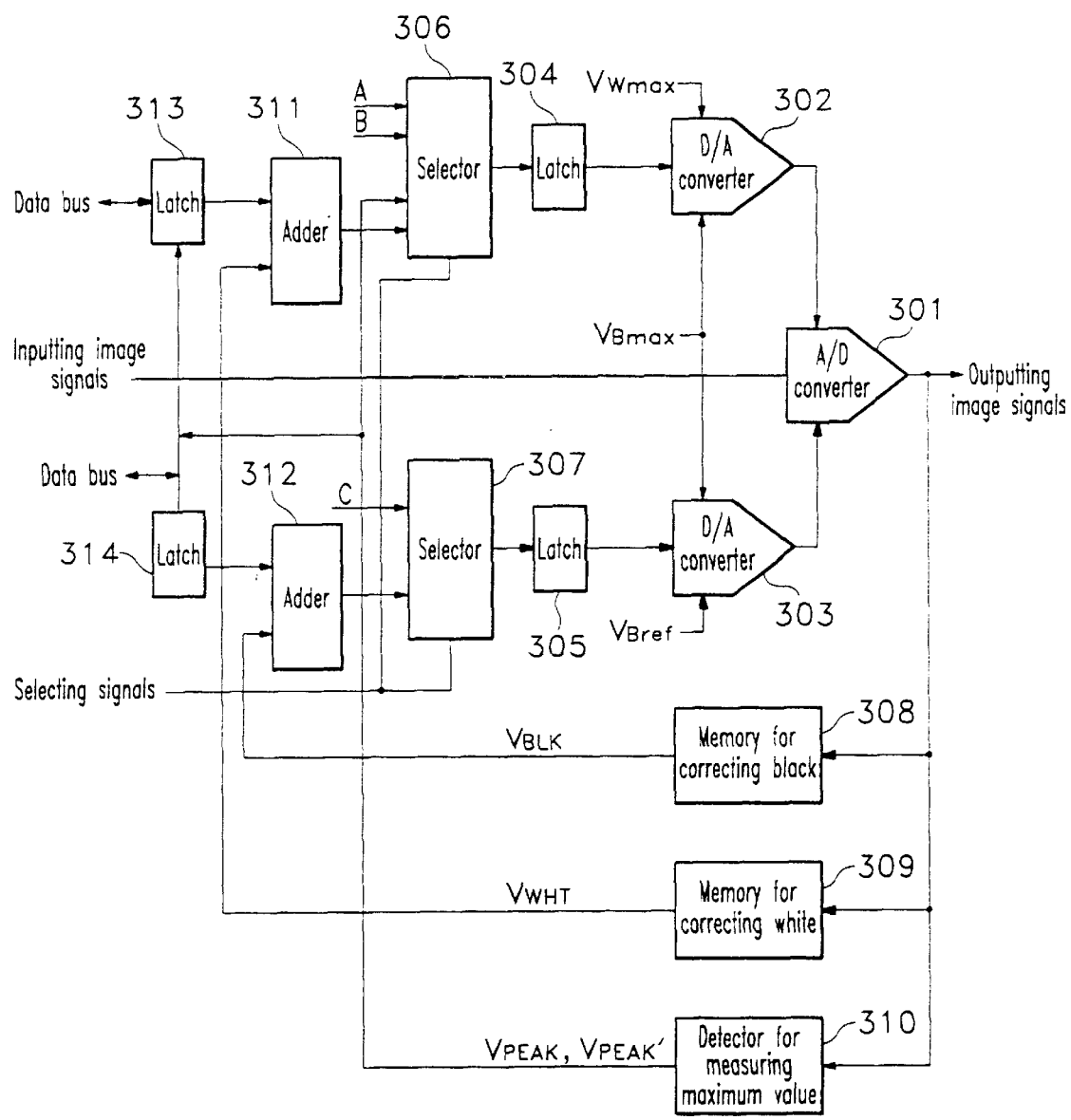
FIG. 2 is a block diagram showing a construction of a preprocessor of an apparatus for processing image according to the first embodiment of the present invention.

FIG. 2 is a block diagram showing a circuit of a preprocessor of an apparatus for processing an image according to the first embodiment of the present invention.

As shown in FIG. 2, an A/D converter 301 converts an output signal of a CCD sensor (not shown) into a digital signal. D/A converters 302 and 303 respectively generate an upper limited reference voltage and a lower limited reference voltage while A/D converter 301 carries out an operation of A/D conversion. On the other hand, digital data corresponding to the upper limited reference voltage and the lower limited reference voltage are respectively stored in latches 304 and 305. Black correcting data which are output from the A/D converter 301 are stored in a black correcting memory 308. White correcting data which are also output from the A/D converter 301 are stored in a white correcting memory 309. A detector for measuring a maximum value 310 detects the maximum value of the digital data which are output from the A/D converter 301. A first adder 311 receives data $V_{WHT}$ output from the white correcting memory 309 and a second adder 312 receives data $V_{BLK}$ output from the black correcting memory 308. Latches 313 and 314 receive temporary data which are transmitted through data buses from a controller of a scanner before providing the data to the first and second adders 311 and 312, respectively.

Figure 4:
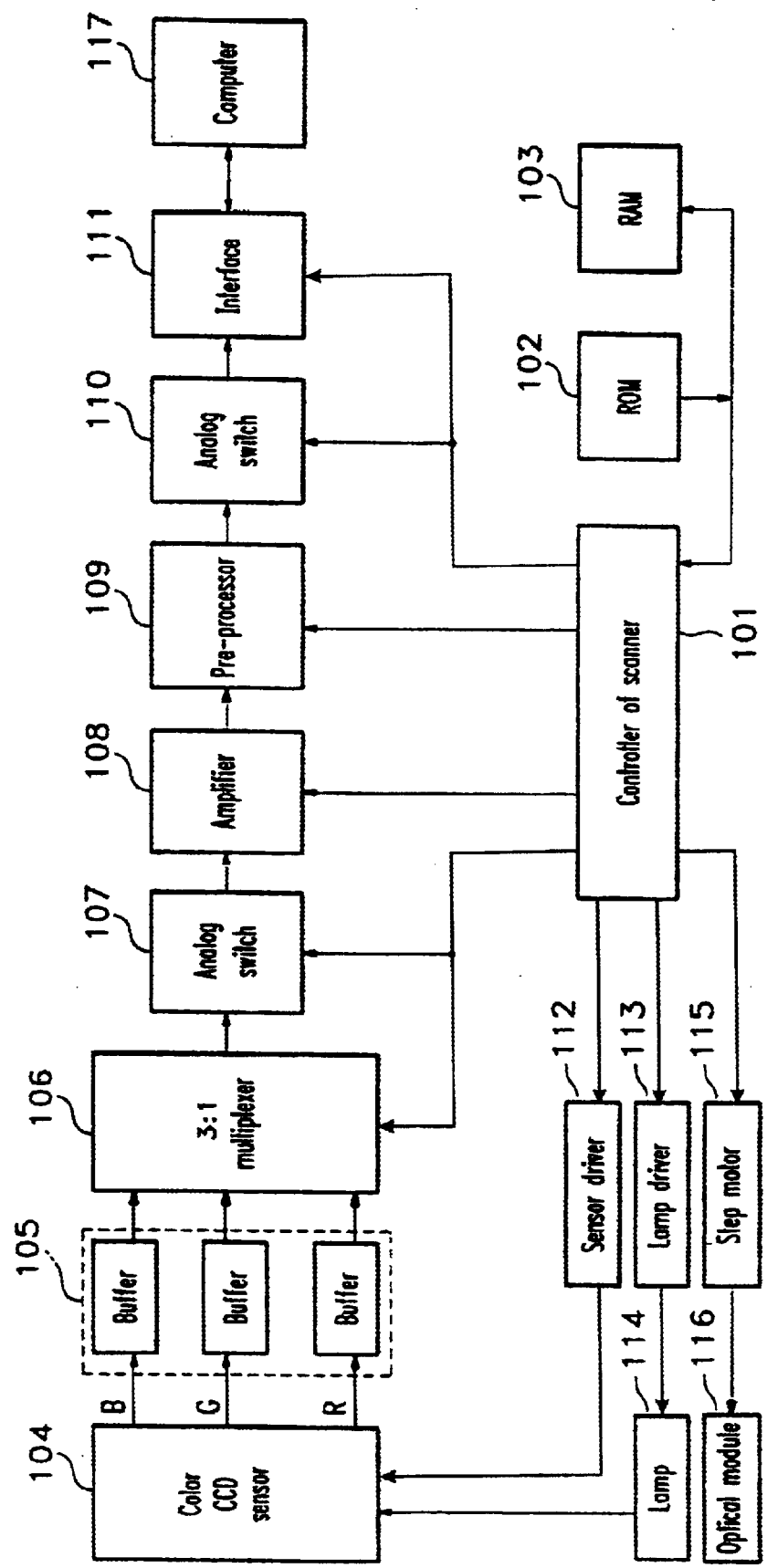
FIG. 4 is a block diagram showing a construction of the apparatus for processing image according to the first embodiment of the present invention.

FIG. 4 is a block diagram showing a construction of the apparatus for processing the image according to the first embodiment of the present invention. As shown in FIG. 4, a controller 101 controls all of operations of the scanner. Above all, controller 101 generates a timing signal necessary for carrying out a series of the scanning operation so as to read the image of the object as digital data. A program and reference data are stored in ROM 102 so that the controller 101 controls a scanner system in a predetermined order. The temporary data are stored in a RAM 103, which are generated while the controller 101 controls the system of the scanner. A lamp 114 is driven by a lamp driver 113 according to a control signal from the controller 101 to output the lights of red, green, and blue. The lights of red, green, and blue are emitted from the lamp 114 to the object through an optical module 116 and then reflected by the object to be transmitted to a color CCD sensor 104. On the other hand, a step motor 115 makes the optical module 116 move in a subscanning direction according to a driving signal from the controller 101. The color CCD sensor 104 photoelectrically converts the respective color information for red, green, and blue into electrical analog signal proportional to an amount of lights which are transmitted to the color CCD sensor 104 through the optical module 116. A sensor driver 112 is supplied with a predetermined signal from the controller 101, which in turn supplies a clock signal for the color CCD sensor 104 so that the color CCD sensor 104 operates suitably. A Buffer 105 transmits an analog signal from the color CCD sensor 104 to a multiplexer 106, while preventing a distortion of the CCD sensor signal due to the multiplexer 106. The multiplexer 106 selectively outputs one of information signals for three colors which are input simultaneously, corresponding to a signal from the controller of the scanner. Also, an analog switch 107 selects an extent of amplification corresponding to a signal from the controller 101. An amplifier 108 amplifies an image signal which is selected by and output from the multiplexer 106 to the extent of amplification which is selected by the analog switch 107 so that the image signal is converted into a predetermined level of output signal and output, which in turn is transmitted to the preprocessor 109. The preprocessor 109 carries out the black correction for the signal which is converted into the predetermined level of the signal and output from the amplifier 108 and converts the analog signal into the digital image data. A memory buffer 10 has temporary image data converted into the digital signal by the preprocessor 109. An interface 111 transmits the image data which are stored in the memory buffer 110 to a computer 117 so as to meet rules of transmission.

Hereinafter, an operation of the apparatus and the method for processing the image according to the first embodiment of the present invention will be described in detail with reference to Table 1 and FIGS. 2, 4, 6A and 6B.

TABLE 1

Modes corresponding to values of the selected signals and the upper and lower reference voltages

| | selected value | | | | | |
|---|---|---|---|---|---|---|
| operation mode | 0<br>generating black correcting value | 1<br>detecting the maximum value | 2<br>generating white correcting value | 3<br>controlling contrast | 3<br>controlling brightness | 2<br>removing background color |
| upper limited voltage | $V_{Bmax}$: A | $V_{Wmax}$: B | $V_{PEAK}$ | $V_{WHT} - m\alpha$ | $V_{WHT} \pm n\beta$ | $V_{PEAK}'$ |
| lower limited voltage | $V_{Bref}$: C | $V_{BLK}$ | $V_{BLK}$ | $V_{BLK} + m\alpha$ | $V_{BLK}$ | $V_{BLK}$ |

Wherein m is a control level of the contrast and n is a control level of the brightness.

First, in order to generate the black correcting data, the selectors 306 and 307 of the preprocessor 109 are supplied with a selecting signal having the value of zero from the controller 101 and each value selected by the each selector is input, respectively, into D/A converters 302 and 303 capable of setting the upper and lower limited reference voltages of the A/D converter 301. As shown in Table 1, when value A is input into D/A converter 302 to output the black maximum voltage $V_{Bmax}$ awhile the value C is input into D/A converter 303 to output the black reference voltage $V_{Bref}$, A/D converter 301 converts the image signal, in the range between the black reference voltage $V_{Bref}$ as the lower limited reference voltage and the black maximum voltage $V_{Bmax}$ as the upper limited reference voltage, into the digital signal, i.e., black correcting voltage $V_{BLK}$, which in turn is stored in the black correcting memory 308 in the order, at step S11.

Then, selectors 306 and 307 of the preprocessor 109 are supplied with a selecting signal having a value of one from controller 101. The selected values selected by each selector 306 and 307 are respectively input into D/A converters 302 and 303 which respectively set the upper and lower limited reference voltages of the A/D converter 301. As shown in Table 1, the value B is input into the D/A converter 302 to output the white maximum voltage $V_{Wmax}$ while the black correcting voltage $V_{BLK}$ which are output from the black correcting memory 308 are input into the D/A converter 303, so that the A/D converter 301 converts the image data in the range between the black correcting voltage $V_{BLK}$ as the lower limited reference voltage and the white maximum voltage $V_{Wmax}$ as the upper limited reference voltage into the digital signal.

At that time, the black correcting data which are stored in the black correcting memory 308 are transmitted together with the pixel synchronous signal so as to output the corrected data for the pixel, thereby carrying out the correction of the black at the A/D converter 301.

At step S12, the image data which are converted into the digital data are sequentially input into the detector 310 and are compared with the image data which already are input therein so as to detect the maximum value. When the CCD sensor carries out the procession of the data on one line, the maximum value which is detected in the region corresponding to the numbers of the effective pixels of the CCD sensor is provided as an input value for the selector 306.

The selectors 306 and 307 of the preprocessor 109 are supplied with a selecting signal having a value two from the controller 101 to generate the white correcting value. The value which is selected by each selector is input D/A converters 302 and 303, respectively, which set the upper and lower limited reference voltages of the A/D converter 301. As shown in Table 1, the maximum value which is selected by the maximum value detecting detector 301 is input into the D/A converter 302 while the black correcting data which are output from the black correcting memory 308 are input into the D/A converter 303, so that A/D converter 301 converts the image signal in the range between the black correcting voltage $V_{BLK}$ as the lower limited reference voltage and the white reference plate maximum voltage $V_{PEAK}$ as the upper reference voltage into the digital data. The digital data are stored in the white correcting memory 309 in the order so that the generation of the white correcting data is completed, at the step S13.

When the generation of the white correcting data is completed, the color image inputting device can carry out an input of the object image in a state of preparing the input of the image. Furthermore, the user can select one of various processing modes before introducing the performance of the scanning so as to improve the quality of the image according to the condition of the object image.

When the scanner reads the document, the selector 306 and 307 of the preprocessor 109 are it supplied from the controller 101 with the selected signal having the selected value according to the control operations of the contrast and the brightness and then the selected signal is input into the two of D/A converters 302 and 303 which set the upper and lower limited reference voltages of the A/D converter 301, at the step S20. At the step S21, it is determined whether the image processing which the user has selected is the control operation of the contrast.

If the image processing which the user has selected is the control operation of the contrast, the selected signal has a value three as shown in Table 1 and the adder 311 adds first data−mα which are stored in the latch 313 to the white correcting data $V_{WHT}$ which are output from the white correcting memory 309. Then, the data $V_{WHT}$−mα are Input into the D/A converter 302 so as to be used as the upper limited reference voltage. Furthermore, the adder 312 adds second data+mα which are stored in the latch 314 to the black correcting data $V_{BLK}$ which are output from the black correcting memory 308. The data $V_{BLK}$+mα are input into the D/A converter 303 so as to be used as the lower limited reference voltage, at the step 22. Therefore, the A/D converter 301 converts the image signal in the range between the lower limited reference voltage $V_{BLK}$+mα and the upper limited reference voltage $V_{WHT}$−mα into the digital signal.

Here, m represents the control level of the contrast and a represents a changed value of the contrast. The changed value α of the contrast will be obtained provided that the control level m of the contrast is controlled to the extent of the level 128 of the white and the level 128 of the black, as follows:

α=the maximum pixel value of the white reference plate/256

When the user selects any one level of the 128 levels including the positive and the negative so as to carry out controlling the contrast, the image is processed such that the white is gradually bright on the positive level and that the black is gradually dark on the negative level.

When the white is selected on the level 3 and the black is selected on the level 4, the changed value of the white is 3α and the changed value of the black is 4α. Therefore, in order to select the upper limited reference voltage $V_{WHT}$−3α and the lower limited reference voltage $V_{BLK}$+4α before starting to control the contrast, the corrected value of 3α is stored in the latch 313 and the corrected value of 4α is stored in the latch 314.

As described above, the third data (the corrected value of 3α) which is stored in the latch 313 is added to the white correcting value by the adder 311 so as to generate the upper limited reference voltage of the A/D converter 301 and the forth data (4α) which is stored in the latch 314 is added to the black correcting value by the adder 312 so as to generate the lower limited reference voltage of the A/D converter 301. When the control of the contrast is performed, the white correction data $V_{WHT}$, which are sequentially stored in white correction memory 309, are input into adder 311 again to be used as the reference voltage for obtaining the upper limited voltage during the controlling of the contrast at step S13. Further, when the control of the contrast is performed again, the black correction data $V_{BLK}$, which are sequentially stored in black correcting memory 308, are input into adder 312 again to be used as the reference voltage for obtaining the lower limited voltage during the controlling of the contrast at step S11.

On the other hand, if the user does not select the step for controlling the contrast for image at the step S21, it is determined whether the control of the brightness is carried out at the step S23.

When the control of the brightness is carried out, the selected signal has a value of 3 as shown in Table 1 and the adder 311 adds data±nβ which are stored in the latch 313 to the white correcting data $V_{WHT}$ which are output from the white correcting memory 309 so that the data $V_{WHT}$±nβ are input into the D/A converter 302 to be used as the upper reference voltage. Furthermore, the black correcting data $V_{BLK}$ which are output from the black correcting memory 308 are input into the D/A converter 303 to be used as the lower reference voltage, at the step S24. The A/D converter 301 converts the image signal in the range between the lower limited reference voltage $V_{BLK}$ and the upper limited reference voltage $V_{WHT}$±nβ into the digital data.

In a mode of reading the document image, the adder 311 is supplied with a latched value nβ which is transmitted from the data bus of the scanner controller 101 so as to set the upper limited reference voltage. The value nβ is determined as follows:

β=(the maximum pixel value of the white reference plate—the maximum pixel value of the document during the prescanning)/n wherein the n is the control level of the brightness.

That is, a difference of the maximum pixel value $V_{PEAK}$ of the white reference plate reduced by the maximum pixel value $V_{PEAK}'$ which is obtained during the prescanning mode before the reading mode of the object image is divided by the control level of the brightness to obtain the changed value β of the upper limited value to be used for the control of the brightness on the image.

The changed value of the upper limited value which is obtained by the above equation is used for carrying out the operation as described below according to the control level of the brightness on the image.

That is, when the user controls the brightness of the output image to be dark, the upper limited reference voltage is increased so that the dark image is output. For example, when the user selects a level 3 making the image dark, the microprocessor stores the upper limited changed value $3\beta$ in the latch 313 through the data bus and the adder 311 adds the upper limited changed value $3\alpha$ to the white correcting data $V_{WHT}$ which are output from the white correcting memory 309 so as to generate the upper limited reference voltage $V_{WHT}+3\beta$: The upper limited reference voltage $V_{WHT}+3\beta$ is supplied through the latch 304 for the D/A converter 302.

When the user controls the image to be bright, the upper limited reference voltage is decreased so that the bright image is output. For example, when the user selects a level 5 making the image bright, the microprocessor stores the upper limited changed value $5\beta$ in the latch 313 through the data bus and the adder 311 adds the upper limited changed value $5\beta$ to the white correcting data $V_{WHT}$ which are output from the white correcting memory 309. This result in reducing the white correcting data $V_{WHT}$ by the changed value $5\beta$ from the upper limited value. The upper limited reference voltage $V_{WHT}-5\beta$ is generated and is supplied through the latch 304 for the D/A converter 302. When the control of the brightness is performed again, the white correction data $V_{WHT}$, which are sequentially stored in white correcting memory 309, are input into adder 311 again to be used as the reference voltage for obtaining the upper limited voltage during the controlling of the brightness at step S13, Further, when the control of the brightness is performed again, the black correction data $V_{BLK}$, which are sequentially stored in black correcting memory 308, are input into adder 312 again to be used as the reference voltage for obtaining the lower limited voltage during the controlling of the brightness.

If the operation of processing image which the user selects is not the control of the brightness at the step S23, it is determined whether the operation which the user selects is the removal of the background color from the image, at the step S25.

When the operation of removing the background color from the image is carried out, the selected signal has the value 2 as shown in Table 1. The maximum pixel value $V_{PEAK}'$ of the object which is detected by the detector 310 is selected by the selector 306 and then is input into the D/A converter 302 through the latch 304 so that the upper limited reference voltage $V_{PEAK}'$ is generated to be used for processing the background color. Furthermore, the black correcting data $V_{BLK}$ which is output from the black correcting memory 308 is selected by the selector 307 and then is input into the D/A converter 303 through the latch 305 so that the lower limited reference voltage $V_{BLK}$ is generated to be used for processing the background color, at the step 26.

Therefore, the A/D converter 301 converts the image signal in the range between the lower limited reference voltage $V_{BLK}$ and the upper limited reference voltage $V_{PEAK}'$ into the digital data. When the removing of the background color from the image is performed again, the maximum pixel value of the document is detected by maximum value detector 310 to be used as the upper limited voltage during the removal of the background color and is input into selector 306 again. Further, the black correcting data $V_{BLK}$, which are sequentially stored in black correcting memory 308, are input into adder 312 again to be used as the lower limited voltage during the removal of the background color at step S11.

The white correcting operation is not carried out during the removing of the background color from the image. The reason for that is that since an accuracy of removing the background color of the image and a reference level to binarize the image data rather than the white correcting on the pixels of the output image have an effect on the output image as binarized image data are used as the image so that the scanner generally recognizes the characters during the scanning, the operation of removing the background color is made simple.

When the upper and lower limited reference voltages are determined and used for carrying out the reading of the object, the black correcting process and the operation for removing the background color are carried out simultaneously. Accordingly, the desired correcting process and the image processing can be accomplished by using a simple circuit, at the step S30.

The digital data which are generated during the processing as described above are selectively or simultaneously subjected to the black correcting processing by the black correcting voltage, the white correcting processing by the white correcting voltage, the operation of controlling the contrast and brightness, and the operation for removing the background color. Thereby, the operation for correcting and processing the image preferably can be tarried out by a simple circuit.

The digital image data are output from the object image after carrying out the correction of the distortion of the object image and the process of the object image, at the step 40.

Figure 3:
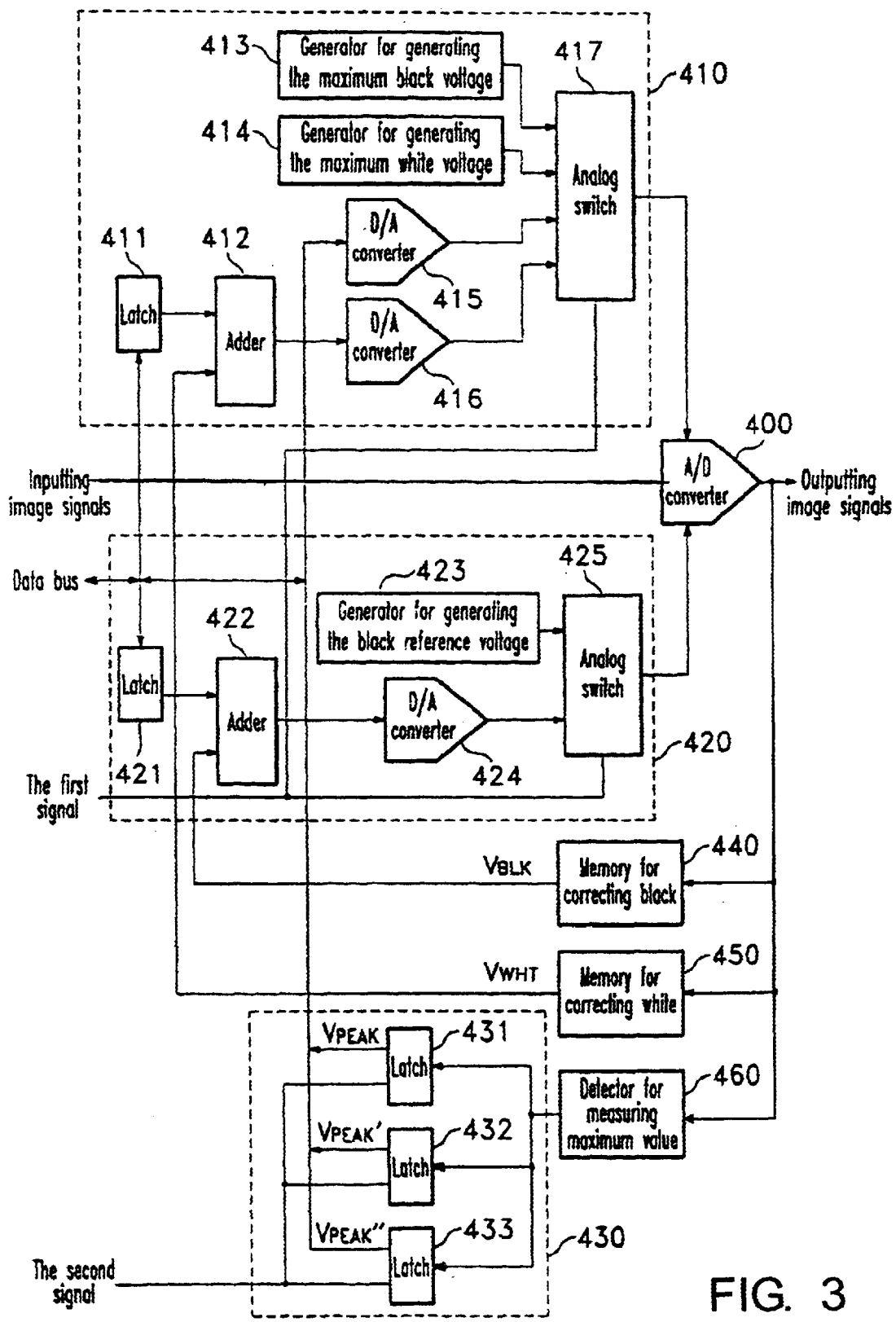
FIG. 3 is a block diagram showing a construction of a preprocessor of an apparatus for processing image according to the second embodiment of the present invention.

FIG. 3 is a block diagram showing a construction of a preprocessor of an apparatus for processing image according to the second embodiment of the present invention. As shown in FIG. 3, an A/D converter 400 converts an analog output signal of a CCD (not shown) into a digital signal. A maximum black voltage generator 413 generates an upper limited reference voltage while the A/D converter 400 converts the analog signal into the digital signal A maximum white voltage generator 414 generates an upper limited reference voltage while the A/D converter 400 converts the analog signal into the digital signal. A black reference voltage generator 423 generates a lower limited reference voltage while the A/D converter 400 converts the analog signal into the digital signal. On the other hand, a D/A converter 415 converts a maximum value of a white reference plate stored in a latch 432 into an analog voltage. A D/A converter 416 converts an output value of a latch 411 which is controlled according to a mode of processing image selected by an user and has a changed value stored therein and an output value of an adder 412 which adds white correcting data into the analog voltage. A D/A converter 424 converts an output value of a latch 421 which is controlled by the user and has a changed value stored therein and an output value of an adder 422 which adds black correcting data into the analog voltage. An analog switch 417 selects any one of data output from the maximum black voltage generator 413, the maximum white voltage generator 414, the D/A converter 415, and the D/A converter 416 according to a signal for selecting an operation mode. An analog switch 425 selects any one of data output from the black reference voltage generator 423 and the D/A converter 424 according to a signal for selecting an operation mode. On the other hand, a black correcting memory 440 has black correcting data output from the A/D converter 400 stored therein. A white correcting memory 450 has white correcting data output from the A/D converter 400 stored therein. A detector 460 for measuring a maximum value detects the maximum value by using digital data output from the A/D converter 400. The latch 431 has the maximum value of the white reference plate detected by the detector 460. The maximum pixel value of the document is stored in a latch 432. A maximum value of a main scanning line is stored in a latch 433. The analog switch 417 selects any one of data output from the maximum black voltage generator 413, the maximum white voltage generator 414, the D/A converter 415, and the D/A converter 416 according to a first selecting signal of a controller and sets the one of data as the upper limited reference voltage according to an operation mode of processing the image and an operation mode of correcting a distortion of the image. Moreover, the analog switch 417 selects any one of data output through the D/A converter 415 from the latch 431, the latch 432, and the latch 433 according to a second selecting signal of the controller and supplies the one of data for the A/D converter 400.

Figure 5:
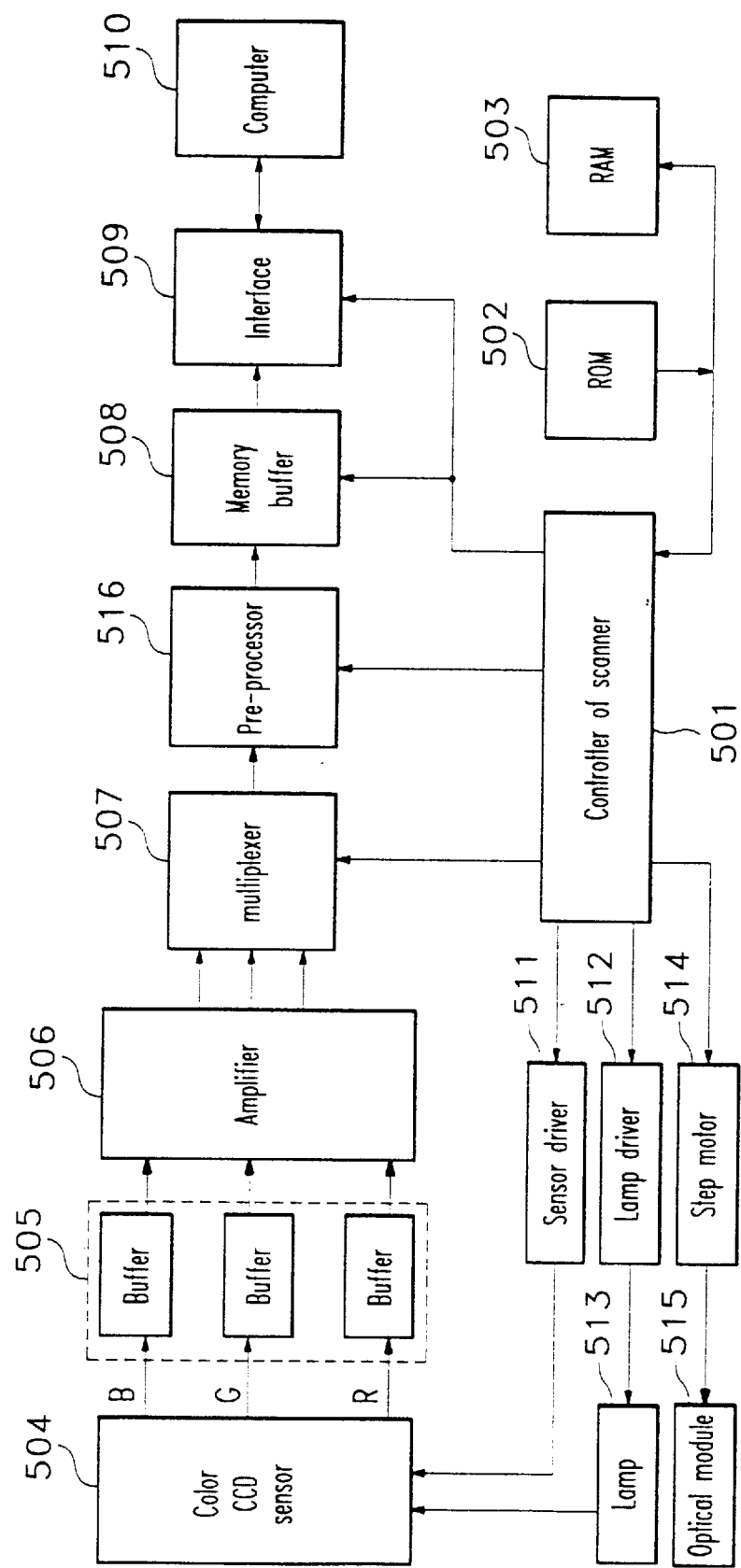
FIG. 5 is a block diagram showing a construction of the apparatus for processing image according to the second embodiment of the present invention.
Figure 6A:
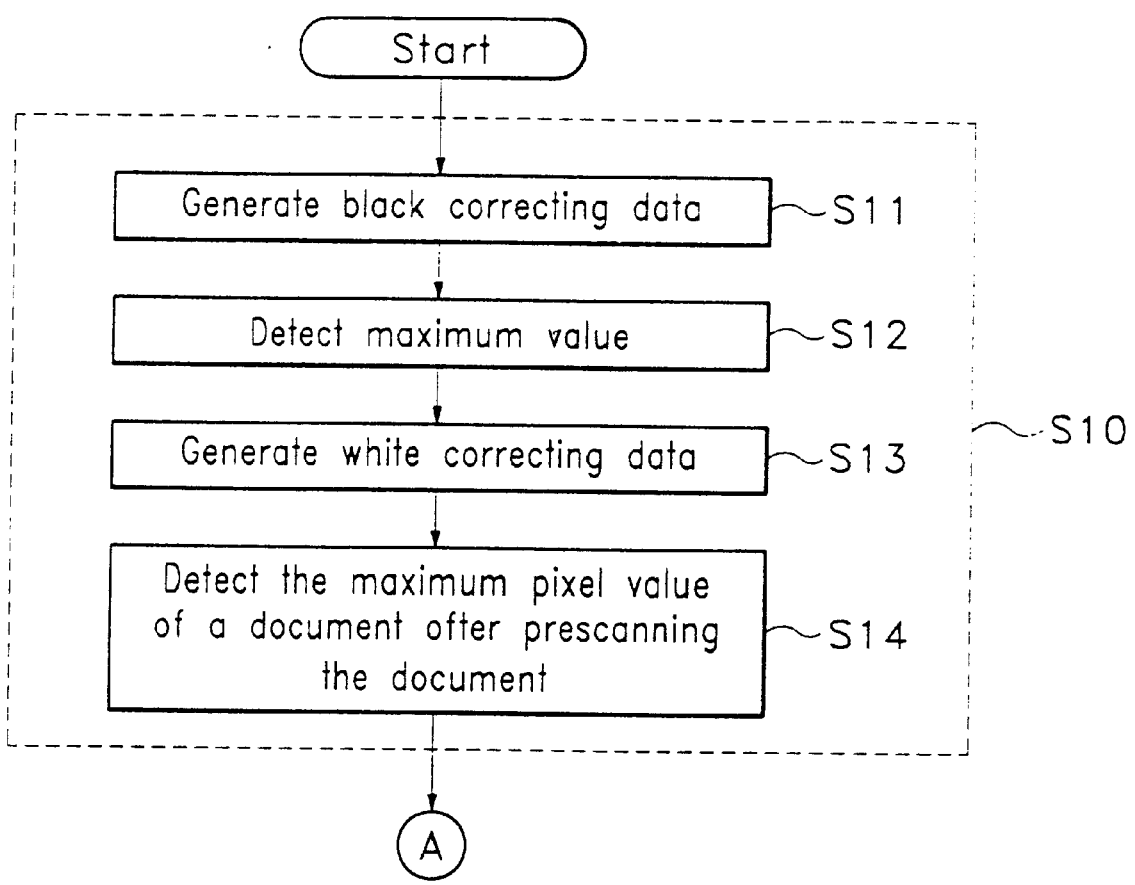
FIGS. 6A and 6B are a flow chart showing the sequence of processing image according to the other aspect of the present invention.
Figure 6B:
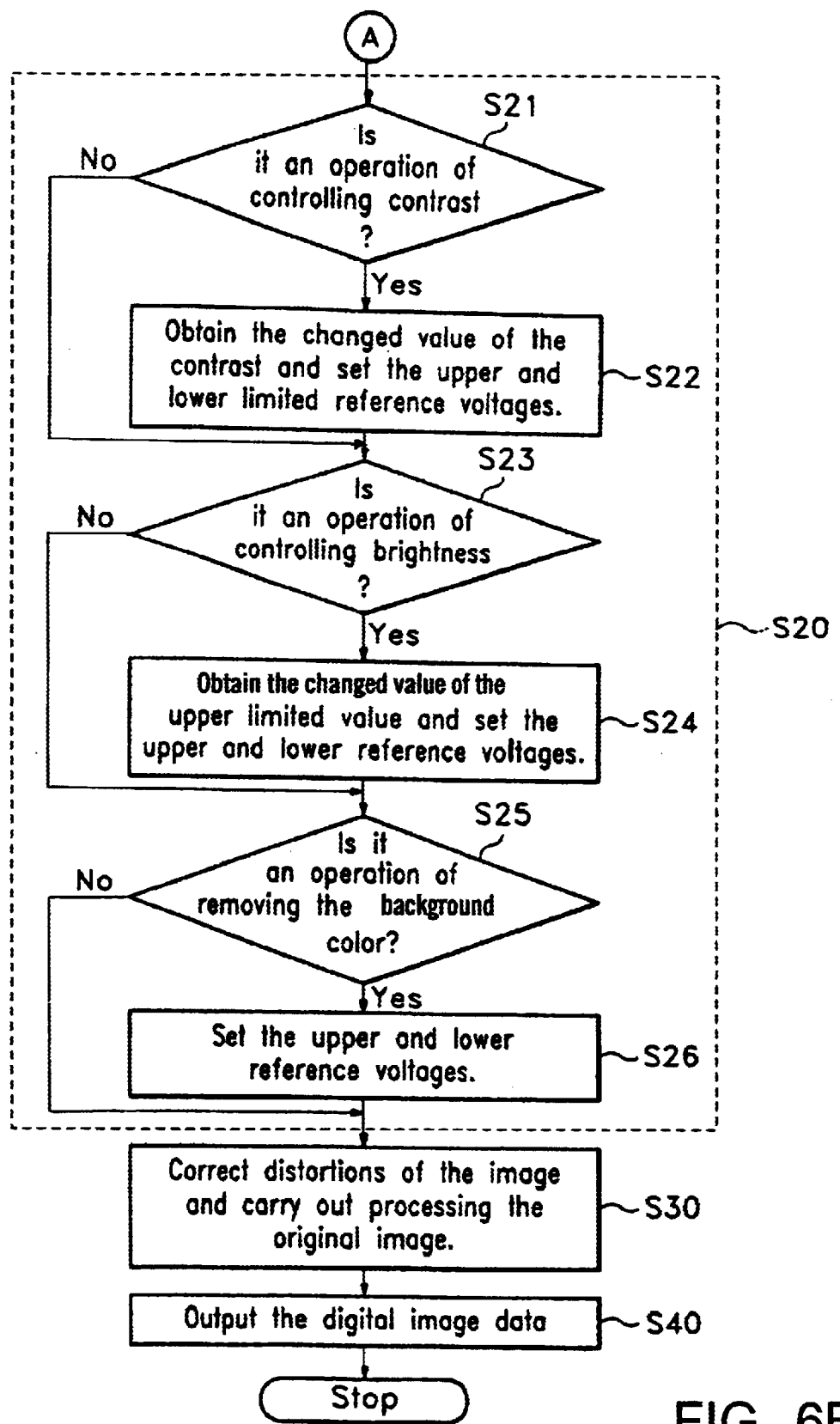

FIG. 5 is a block diagram showing a construction of the apparatus for processing image according to the second embodiment of the present invention. As shown in FIG. 5, a controller 501 generates a timing signal necessary for performing a series of scanning operation so as to read document image as digital data and transfers the selected signal corresponding to the operation mode to a preprocessor 516. Furthermore, the controller 501 controls overall operations of the apparatus for processing the image. A program and reference data are stored in a ROM 502 to control a scanning system according to a control sequence of the controller 501. Temporary data are generated while the controller 501 of the scanner controls the system and stored in a RAM 503. A lamp 513 is driven by a lamp driver 512 according to the control signal of the controller 501 of the scanner and emits three colors of lights such as a red, a green, and a blue. An optical module 515 provides a pathway for the three colors of lights so that the three colors of lights emitted from the lamp 513 are reflected by the document and then input to a photoelectric device. The optical module 515 focuses the three colors of the lights on the color, CCD sensor 504. On the other hand, a step motor 514 is controlled according to a driving signal of the controller 501 of the scanner and moves the optical module 515 in a subscanning direction of the document. The color CCD sensor 504 photoelectrically converts color information for the three primary colors of lights such as the red, the green, and the blue into analog signals in proportion to amount of the light input through the optical module 515. The sensor driver 511 is supplied with a predetermined signal from the controller 501 of the scanner and provides clock signals for the color CCD sensor 504 so that the color signal sensor 504 operates suitably. Buffers 505 transfers the analog signals output from the color CCD sensor 504 to an amplifier 506 which prevents the analog signals of the CCD sensor from being distorted. The amplifier 506 amplifies signals relating the three colors of light to a predetermined extent according to the signal of the controller 501 of the scanner so as to convert the signals relating the three colors of light into a certain level of an output signal and provides the output signal for a multiplexer 507. The multiplexer 507 selects any one of information signals for the three colors which are output from the amplifier 506 and supplies the one information signal for a preprocessor 516. The preprocessor 516 receives image signal which the multiplexer 507 selects and performs a correcting of a distortion of the image and a processing of the image. A memory buffer 508 temporary has image data which are converted into digital data by the preprocessor 516. An interfacing section 509 transfers the image data stored in the memory buffer 508 to a computer 510 according to a rule of transferring data.

Hereinafter, an operation of the apparatus and the method for processing the image according to the second embodiment of the present invention will be described in detail with reference to a Table 2 and FIGS. 3, 5, 6A and 6B.

TABLE 2

Modes corresponding to values of the selected signals and the upper and lower reference voltages

| | selected value | | | | | |
|---|---|---|---|---|---|---|
| operation mode | 0<br>generating black correcting value | 1<br>dectecting the maximum value | 2<br>generating white correcting value | 3<br>controlling contrast | 3<br>controlling brightness | 2<br>removing background color |
| upper limited voltage | $V_{Bmax}$: A | $V_{Wmax}$: B | $V_{PEAK}$ | $V_{WHT} - m\alpha$ | $V_{WHT} \pm n\beta$ | $V_{PEAK}'$ |
| lower limited voltage | $V_{Bref}$: C | $V_{BLK}$ | $V_{BLK}$ | $V_{BLK} + m\alpha$ | $V_{BLK}$ | $V_{BLK}$ |

Wherein m is a control level of the contrast and n is a control level of the brightness.

First, in order to generate the black correcting data, a first signal which is provided from the controller 501 of the scanner to the preprocessor 516 has a value of zero and is provided to analog switches 417 and 425. The values which are selected by each analog switch 417 and 425 are input as an upper limited reference voltage and a lower limited reference voltage in an A/D converter 400.

As shown in the Table 2, when the value of the first selected signal is the zero, the analog switch 417 transfers a signal which is generated from the maximum black voltage generator 413 to the A/D converter 400 and the analog switch 425 transfers a signal which is generated from the reference black voltage generator 423 to the A/D converter 400. The signal of the maximum black voltage generator 413 and the signal of the reference black voltage generator 425 respectively are set as an upper reference voltage and a lower reference voltage in the A/D converter 400.

Accordingly, when generating the black correcting data, the A/D converter 400 converts the image signals into the digital data in the range between the maximum black voltage $V_{Bmax}$ as the upper reference voltage and the reference black voltage $V_{Bref}$ as the lower reference voltage. Then, the A/D converter 400 makes the digital data to be sequentially stored in a black correcting memory 440, at the step S11.

In order to detect the maximum value, step S12, the first signal which is provided from the controller 501 of the scanner to the preprocessor 516 has a value of one, and is provided for the analog switches 417 and 425. The values which are selected by each analog switch respectively are input as the upper limited reference voltage and the lower limited reference voltage to the A/D converter 400.

As shown in Table 2, when the first signal is the one, the analog switch 417 transfers a signal which is generated by a maximum white voltage generator 414 to the A/D converter 400 and the analog switch 425 transfers a black correcting data which are output from the black correcting memory 440 to the A/D converter 400. The signal of the maximum white voltage generator 414 and the black correcting data respectively are set as the upper limited reference voltage and the lower limited reference voltage in the A/D converter 400.

Accordingly, when detecting the maximum value, the A/D converter 400 converts the image signal into the digital signal in the range between the maximum white voltage $V_{Wmax}$ as the upper limited reference voltage and the black correcting voltage $V_{BLK}$ as the lower limited reference voltage.

As the black correcting data which are stored in the black correcting memory 440 are output in correspondence with a pixel synchronous signal, the A/D converter 400 performs the correcting of the black by using the black correcting voltage $V_{BLK}$ which is output through the D/A converter 424 and the analog switch 425. The image data which are converted into the digital data are input into the detector 460 for detecting the maximum value and compared with a former pixel value, at the step S12.

In order to generate a white correcting value, step S13, the first signal which is provided from the controller 501 to the preprocessor 516 has a value of two and provided for the analog switches 417 and 425. The values which are selected by each analog switch are input as the upper limited reference voltage and the lower limited reference voltage into the A/D converter 400.

As shown in Table 2, when a value of the first signal is two, the analog switch 417 transfers a voltage into which the maximum value of the white reference plate detected by the maximum value detector 460 is converted by the D/A converter 415 to the A/D converter 400 and the analog switch 425 transfers a voltage into which the black correcting data output from the black correcting memory 440 are converted by the adder 422 and the D/A converter 424 to the A/D converter 400. The voltages transferred by the analog switches 417 and 425 are respectively set as the upper limited reference voltage and the lower limited reference voltage in the A/D converter 400.

When generating the white correcting value, the A/D converter 400 converts the image signal into the digital data in the range between the maximum voltage $V_{PEAK}$ of the white reference plate as the upper limited reference voltage and the black correcting voltage $V_{BLK}$ as the lower limited reference voltage. The digital data which are generated during the process are stored in the white correcting memory 450 in the sequence and the operation of generating the white correcting data, at the step S13.

Next, the maximum pixel value is detected in a prescanning mode which is performed before a mode of reading the document image, at the step S14. When above operation is completed, the color image inputting device is able to start reading the document image.

The user can select one of performing control of the contrast, control of the brightness, and removing of the background color to improve the quality of the document image by using the driving program carried out on the computer 510 before performing the scanning of the document.

When scanning the document, the first signal which is provided from the controller 501 of the scanner to the preprocessor 516 is converted according to the operations of controlling the contrast, controlling the brightness, and removing the background color and provided for the analog switches 417 and 425. The value selected by each analog switch 417 and 425 is input as the upper limited reference voltage and the lower limited reference voltage into the A/D converter 400, at the step S20.

At the step S21, it is determined whether the user selects the operation of controlling the contrast to process the image. If the user selects the operation of controlling the contrast, the first signal has a value of three as a input value as shown in Table 2.

Then, the adder 412 adds the white correcting data $V_{WHT}$ output from the white correcting memory 450 to the data–mα stored in the latch 411. The adder 412 transfers the white correcting data $V_{WHT}$ added to the data–mα to the analog switch 417 through the D/A converter 416. The analog switch 417 selects the white correcting data $V_{WHT}$ added to the data–mα as the upper limited reference voltage, at the step S22.

Furthermore, the adder 422 adds the black correcting data $V_{BLK}$ output from the black correcting memory 440 to the data+mα stored in the latch 421. Then, adder 422 transfers the black correcting data $V_{BLK}$ added to the data+mα to the analog switch 425 through the D/A converter 422. The analog switch 425 selects the black correcting data $V_{BLK}$ added to the data+mα as the lower limited reference voltage, at the step S22.

Accordingly, the A/D converter 400 converts the image data into the digital data in the range between the upper limited reference voltage $V_{WHT}$–mα and the lower limited reference voltage $V_{BLK}$+mα.

The m represents a control level for the contrast and the a represents a changed value for the contrast. Provided that the control level of the contrast m is set to 128 level for the white and 128 level for the black, the changed value for the contrast a can be obtained as follows:

α=the maximum pixel value of the white reference plate/ 256 when the user selects the specified control levels including the positive value and the negative value so as to control the contrast, the control level for the contrast having the positive value makes the image to be processed to have more bright white color and the control level for the contrast having the negative value makes the image to be processed to have more dark black color.

When selecting a level 3 as the control level for the contrast of the white color and a level 4 as the control level for the contrast of the black color, the changed value of the contrast for the white color is 3β and the changed value of the contrast for the black color is 4α.

The data 3β is stored in the latch 411 through the data bus and the data 4α is stored in the latch 421 through the data bus in order to select the upper limited reference voltage $V_{WHT}$–3α and the lower limited reference voltage $V_{BLK}$+4α before performing the control of the contrast.

Then, the adder 412 adds the data 3α stored in the latch 411 to the white correcting value and transfers the data 3α added to the white correcting value to the analog switch 417 through the D/A converter 416. The analog switch 417 provides the data 3α added to the white correcting value as the upper limited reference voltage for the A/D converter 400.

The adder 422 adds the data 4α stored in the latch 421 to the black correcting value and transfers the data 4α added to the black correcting value to the analog switch 425 through the D/A converter 424. The analog switch 425 provides the data 4α added to the black correcting value as the lower limited reference voltage for the A/D converter 400.

On the other hand, if the user do not select the operation of controlling the contrast at the step S21, it is determined whether the user selects the operation of controlling the brightness, at the step S23.

When the operation of controlling the brightness is selected, the first signal has the input value 3 as shown in Table 2.

The adder 412 adds the data±nβ and stored in the latch 411 to the white correcting data $V_{WHT}$ output from the white correcting memory 450 and transfers the data±nβ added to the white correcting data $V_{WHT}$ to the analog switch 417 through the D/A converter 416. The analog switch 417 provides the data±nβ added to the white correcting data $V_{WHT}$ as the upper limited reference voltage for the A/D converter 400, at the step S24.

Furthermore, the black correcting data $V_{BLK}$ output from the black correcting memory 440 is input into the D/A converter 424 and set as the lower limited reference voltage in the D/A converter 424 at the step S24. Accordingly, the A/D converter 400 converts the image signal into the digital data in the range between the upper limited reference voltage $V_{WHT}±nβ$ and the lower limited reference voltage $V_{BLK}$.

The data, nβ stored in the latch is determined as follows to be set as the upper limited reference voltage in controlling the brightness. That is, the changed value β of the upper limited reference voltage used for controlling the brightness of the image is obtained by subtracting the maximum pixel value $V_{PEAK}'$ of the document data which are obtained during the scanning of the document from the maximum pixel value $V_{PEAK}$ of the white reference plate and by dividing the resultant value resulting from the subtraction by level number for the control of the brightness.

β=(the maximum pixel value of the white reference plate—the maximum pixel value in the prescanning of the document)/n wherein the n is the control level of the brightness.

The CPU performs the following operation by using the changed value of the upper limited reference voltage according to the control level for the brightness which the user selects.

When the user makes the image to be dark, the CPU increases the upper limited reference voltage so as to make the image to be dark. That is, the adder 412 adds the white correcting data $V_{WHT}$ output from the white correcting memory 450 to the changed value 3β of the upper limited stored in the latch 411 according to the control level for the brightness which the user selects and generates the upper limited reference voltage $V_{WHT}+3β$. The upper limited reference voltage $V_{WHT}+3β$ is provided for the A/D converter 400 through the D/A converter 416 and the analog switch 417.

On the other hand, when the user makes the image to be dark, the CPU decreases the upper limited reference voltage to make the image to be dark.

The changed value, for example −5β, of the upper limited value is stored in the latch 411 according to the control level for the brightness which the user selects. The adder 412 adds the changed value −5β to the white correcting data $V_{WHT}$ output from the white correcting memory 450. That is, the adder 412 generates the upper limited reference voltage $V_{WHT}−5β$ The upper limited reference voltage $V_{WHT}−5β$ is provided for the A/D converter 400 through the D/A converter 416 and the analog switch 417.

If the user do not select the operation of controlling the brightness for the image at the step S23, it is determined whether the operation of removing the background color, at the step S25. The removing of the background color can be performed in the two different manners as follows.

As the first signal has an input value 2, the maximum pixel value $V_{PEAK}'$ or $V_{PEAK}''$ of the document detected by the detector 460 is selected and transferred to the A/D converter through the D/A converter 416 and the analog switch 417 to generate the upper limited reference voltage with respect to the removing of the background color, at the step S26.

On the other hand, the adder 422 adds the data stored in the latch 421 and having zero to the black correcting data $V_{BLK}$ output from the black correcting memory 440 and transfers the result to the A/D converter 400 through the D/A converter 424 and the analog switch 425. Then, the A/D converter 400 generates the lower limited reference voltage to remove the background color at the step S26.

Accordingly, the A/D converter 400 converts the image signal into the digital data in the range between the upper limited reference voltage $V_{PEAK}'$ or $V_{PEAK}''$ and the lower limited reference voltage $V_{BLK}$.

The removing of the background color from the document image can be accomplished in the first manner of using the maximum value of the document image which is detected by the detector 460 for detecting the maximum value during the prescanning of the document and stored in the latch 432 and in the second manner of using the maximum value which is detected from a main scanning line and stored in the latch 433.

In the case of using the maximum value stored in the latch 432, the maximum value of the detected document data is used as the upper limited reference voltage throughout the document during the prescanning of the document. In the case of using the maximum value stored in the latch 433, the maximum value detected from the main scanning line is used as the upper limited reference voltage during the processing of the next line.

The removing of the background color by using the above two different manners can be accomplished by controlling the second signal according to the mode selected by the user. The black correcting data output from the black correcting memory 440 is used as the lower limited reference voltage in the A/D converter 400.

The difference between the two manners will be described in brief

When the intensity of the background color is constant on the document to be scanned, the removing of the background color is preferably performed in the first manner. When the intensity of the background color is variable on the document to be scanned, the removing of the background color is preferably performed in the second manner.

The correcting of the white is not performed during the removing of the background color from the image data. The reason for that is that as the image data are binarized during the scanning of the document, an accuracy of removing the background color and a reference level for the binarization of the image data rather than the correcting of the white for each pixel have an effect on the quality of the image.

When the scanning of the document are performed after setting the upper and lower limited reference voltages as described above, the operations of correcting the black and removing the background color can be simultaneously performed. Accordingly, the simple circuit causes the processing of the image data to be performed, at the step S30.

Finally, the image data on which the distortion of the image is corrected are converted into the digital data and printed, at the step S40.

According to the present invention as described above, the excellent output image can be obtained by removing factors making the distortion of the image, controlling the contrast and the brightness of the object image, and removing the background color of the image during the conversion of the analog signal to the digital signal with respect to the image. Furthermore, there is an advantage in that the operations for correcting the distortion of the image and for processing the image in various manner cause errors due to object characteristics of element in the circuit to be a generated to a minimum.

Furthermore, since the processing of the image and the correcting of the distortion of the image can be performed by using the A/D converter, it is possible to minimize errors of the image due to the object characteristic of the circuit element.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. An apparatus for processing an image comprising:
   an analog-to-digital converter for converting an analog image signal with respect to document data which are detected and input by an image reading sensor of an image inputting device into digital image data by using a control signal input from a controller of said image inputting device, a changed value of a contrast input from the controller at a selected contrast control level, and a changed value of a brightness input from the controller at a selected brightness control level;
   an upper limited reference voltage setting means for setting the upper limited reference voltage so that the analog-to-digital converter performs a correcting of image distortion and a processing of image;
   a lower limited reference voltage setting means for setting the lower reference voltage so that the analog-to-digital converter performs a correcting of image distortion and a processing of image;
   a black correcting memory for storing black correcting data output after the analog-to-digital converter performs an operation of converting the analog image signal into said digital image data;
   a white correcting memory for storing white correcting data output after the analog-to-digital converter performs an operation of converting the analog image signal into the digital image data; and
   a maximum value detector for detecting a maximum pixel data value from the digital image data output from the analog-to-digital converter.

2. An apparatus for processing an image as claimed in claim 1, wherein the control signal includes:
   a signal for selecting a mode of reading a magnitude of a black current output from pixels of the image reading sensor;
   a signal for selecting a mode of reading a maximum value of an image signal output after a black correcting operation is performed with respect to an analog signal reflected by a white reference plate of the image inputting device;
   a signal for selecting a mode of performing an equalization of the image after detecting distortions of a light source and the white reference plate of the image inputting device;
   a signal for selecting a mode of controlling a contrast to control the contrast of the image; and
   a signal for selecting a mode of removing a background color to remove the background color from the image.

3. An apparatus for processing an image as claimed in claim 2, wherein the signal for selecting the mode of removing the background color includes a signal for selecting a maximum pixel value of the document data obtained in a prescanning mode as the upper limited reference voltage.

4. An apparatus for processing an image as claimed in claim 1, wherein the upper limited reference voltage setting means includes;
   a first adder for adding said changed value of the contrast, input from the controller for controlling the contrast, to the white correcting data output from the white correcting memory when controlling contrast, and adding the changed value of the brightness input from the controller to the black correcting data output from the white correcting memory when controlling brightness;
   a first selector for selecting any one of a value output from the first adder, the maximum pixel data value output from the maximum value detector, and a preset input value according to the operation signal of the image inputting device; and
   a first digital-to-analog converter for receiving the value selected by the first selector as an input value and converting the input value into an analog signal constituting the upper limited reference voltage.

5. An apparatus for processing an image as claimed in claim 4, wherein the lower limited reference voltage setting means includes:
   a second adder for adding the changed value of the contrast, input from the controller for controlling the contrast, to the data output from the black correcting memory when controlling contrast, and adding no input from the controller to the black correcting data output from the black correcting memory when controlling brightness;
   a second selector for selecting any one of a value output from the second adder and another preset input value according to an operation signal of the image inputting device; and
   a second digital-to-analog converter for receiving the value selected from the second selector as an input value and converting the input value into analog signal constituting the lower limited reference voltage.

6. An apparatus for processing an image comprising:
   an analog-to-digital converter for converting an analog image signal with respect to document data which are detected and input by an image reading sensor of an image inputting device into digital data by using a control signal input from a controller of the image inputting device, a changed value of a contrast input from the controller, and a changed value of a brightness;
   an upper limited reference voltage setting means for setting an upper limited reference voltage of the analog-to-digital converter so that the analog-to-digital converter performs a correcting of image distortion and a processing of image;
   a lower limited reference voltage setting means for setting the lower reference voltage of the analog-to-digital converter so that the analog-to-digital converter performs a correcting of image distortion and a processing of image;

a black correcting memory for storing a black correcting data output after the analog-to-digital converter performs an operation of converting the analog image signal into digital data;

a white correcting memory for storing a white correcting data output after the analog-to-digital converter performs an operation of converting the analog image signal into the digital data;

a maximum value detector for detecting a maximum pixel data value from digital data output from the analog-to-digital converter; and a reference data storing section for storing data output from the maximum value detector.

7. An apparatus for processing an image as claimed in claim 6, wherein the control signal includes:

a signal for selecting a mode of reading a magnitude of a black current output from pixels of the image reading sensor;

a signal for selecting a mode of reading a maximum value of an image signal output after a black correcting operation is performed with respect to an analog signal reflected by a white reference plate of the image inputting device;

a signal for selecting a mode of performing an equalization of the image after detecting distortions of a light source and the white reference plate of the image inputting device;

a signal for selecting a mode of controlling a contrast to control the contrast of the document data; and a signal for selecting a mode of removing a background color to remove the background color from the document data.

8. An apparatus for processing an image as claimed in claim 7, wherein the signal for selecting the mode of removing the background color includes a signal for selecting a maximum pixel value of the document obtained in a prescanning mode as the upper limited voltage and a signal for selecting a maximum pixel value in a main scanning line of the image inputting device as the upper limited reference voltage if an intensity of the background is changed in the document data.

9. An apparatus for processing an image as claimed in claim 6, wherein the upper limited reference voltage setting means includes;

a first digital-to-analog converter for receiving a value output from the reference data storing section;

a first adder for adding the changed value of contrast, input from the controller for controlling the contrasts, to the white correcting data output from the white correcting memory when controlling contrast, and adding the changed value of the brightness input from the controller to the black correcting data output from the white correcting memory when controlling brightness;

a second digital-to-analog converter for receiving a value output from the first adder as an input value and converting the input value into an analog signal;

electrostatic voltage generators for generating the black correcting value and a reference voltage for detecting the maximum value; and a first analog switch for selecting any one of data output from the first digital-to-analog converter, the second digital-to-analog converter, and the electrostatic generators according to the control signal so as to set the one of data as the upper limited reference voltage of the analog-to-digital converter.

10. An apparatus for processing an image as claimed in claim 9, wherein the electrostatic generators includes a maximum black voltage generator for generating the upper limited reference voltage to create the black correcting value and a maximum white voltage generator for generating the upper limited reference voltage to detect the maximum value.

11. An apparatus for processing an image as claimed in claim 10 wherein the lower limited reference voltage setting means includes:

a black reference voltage generator for generating a lower limited reference voltage to create the black correcting value;

a second adder for adding a changed value of the contrast, for controlling a contrast input from the controller, to data output from the black correcting memory so as to obtain a lower limited reference voltage when controlling contrast, and adding no input from the controller to the black correcting data output from the black correcting memory when controlling brightness;

a third digital-to-analog converter for receiving a value output from the second adder as an input value and converting the input value into an analog signal; and a second analog switch for selecting any one of data output from the third digital-to-analog converter and the black reference voltage generator so as to set the lower limited reference voltage of the analog-to-digital converter according to the control signal.

12. An apparatus for processing an image as claimed in claim 6, wherein the reference data storing means includes:

a first latch for storing a maximum pixel value for a white reference plate of the image inputting device;

a second latch for storing a maximum pixel value of document data obtained by prescanning the document; and a third latch for storing a maximum pixel value in a main scanning line of the image inputting device.

13. A method for processing an image by an image inputting apparatus having a preprocessor which includes a white correcting memory, a black correcting memory, and a detector for measuring maximum value, the method comprising the steps of:

generating reference data so as to correct a distortion of the image;

determining which operation is selected from operations for respectively controlling a contrast and a brightness, and for removing a background color of the image;

setting an upper limited reference voltage and a lower limited reference voltage corresponding to the selected operation; and performing a white correction and a black correction simultaneously of the image by using the reference data while performing the selected operation for the image by using the upper limited reference voltage and the lower limited reference voltage which are set.

14. A method for processing an image as claimed in claim 13, wherein the step for generating the reference data includes the steps of:

generating a black correcting data to correct errors by an object difference in accordance with an element characteristic of an image reading sensor which is mounted in the image inputting device;

detecting a maximum value of pixel data from the black correcting data; and generating a white correcting data to remove an effect on the image due to distortions of a white reference plate and a light source which are mounted in the image inputting device.

15. A method for processing an image as claimed in claim 13, wherein the step for setting the upper limited reference voltage and the lower limited reference voltage to control the contrast of the image includes the steps of:
- multiplying a contrast control level by a changed value of the contrast;
- generating the upper limited reference voltage by subtracting the multiplied value from a white correcting data which are output from the white correcting memory; and
- generating the lower limited reference voltage by subtracting the multiplied value from a black correcting data which are output from the black correcting memory.

16. A method for processing an image as claimed in claim 15, wherein the changed value of the contrast is obtained by dividing a maximum value of pixel data of the white reference plate in the image inputting device by the control level of the contrast.

17. A method for processing an image as claimed in claim 13, wherein the step for setting the upper limited reference voltage and the lower limited reference voltage to control the brightness includes the steps of:
- multiplying a brightness control level by a changed value of the upper limited reference values;
- generating the upper limited reference value by subtracting a white correcting data which are output from the white correcting memory by the multiplied value; and
- generating the lower limited reference voltage for a black correcting data which are output from the black correcting memory.

18. A method for processing an image as claimed in claim 17, wherein the changed value of the upper limited reference value is obtained by subtracting a maximum pixel value of image which is detected during a prescanning from the maximum pixel value of the white reference plate in the image inputting device and by dividing the subtracted value by a maximum control level of the brightness.

19. A method for processing an image as claimed in claim 13, wherein in order to remove the background color of the image, the maximum pixel value of the image which is detected by the detector for measuring the maximum value is used as the upper limited reference value, while the black correcting data which is output from the black correcting memory is used as a maximum control level of the brightness.

20. A method for processing an image as claimed in claim 13, further including the step of outputting the image of which the image distortion is corrected and for which the selected operation is carried out, as digital image.

* * * * *